United States Patent
Hsieh et al.

(10) Patent No.: US 8,219,098 B2
(45) Date of Patent: *Jul. 10, 2012

(54) FEMTOCELL BASE STATION AND METHOD OF SWITCHING COMMUNICATION SERVICES THEREOF

(75) Inventors: Ching-Feng Hsieh, Taipei (TW); Kuo-Wei Hung, Taoyuan (TW)

(73) Assignee: Askey Computer Corporation, Taipei (TW)

( * ) Notice: Subject to any disclaimer, the term of this patent is extended or adjusted under 35 U.S.C. 154(b) by 39 days.

This patent is subject to a terminal disclaimer.

(21) Appl. No.: 12/956,340

(22) Filed: Nov. 30, 2010

(65) Prior Publication Data

US 2012/0052839 A1 Mar. 1, 2012

(30) Foreign Application Priority Data

Aug. 25, 2010 (TW) .............................. 99128384 A

(51) Int. Cl.
*H04W 36/00* (2009.01)
(52) U.S. Cl. .................. 455/436; 455/437; 370/331
(58) Field of Classification Search ............. 455/436, 455/437; 370/331
See application file for complete search history.

(56) References Cited

U.S. PATENT DOCUMENTS

| 2009/0125630 A1* | 5/2009 | Gogic ........................... 709/227 |
| 2009/0286510 A1* | 11/2009 | Huber et al. .................. 455/410 |
| 2010/0027510 A1* | 2/2010 | Balasubramanian et al. 370/332 |
| 2010/0298008 A1* | 11/2010 | Burroughs ................. 455/456.1 |

* cited by examiner

*Primary Examiner* — Barry Taylor
(74) *Attorney, Agent, or Firm* — Kelly & Kelley, LLP

(57) ABSTRACT

A femtocell base station and method of switching communication services of femtocell base stations. The method establishes an authorization list by which the mobile communication apparatus can be authorized to access the other femtocell base stations within the communication coverage, sets up a communication warning value and a signal capturing duration, performs a timing process when detecting that the signal intensity of itself is less than the communication warning value, and selects another femtocell base station having the highest priority in the priority list as an object for performing a switching process when the timing process counts to the signal capturing duration and the signal intensity of itself is less than the signal intensity of the other femtocell base station having the highest priority in the priority list, so as to interconnect the mobile communication terminal.

10 Claims, 2 Drawing Sheets

FEMTOCELL BASE STATION AND METHOD OF SWITCHING COMMUNICATION SERVICES THEREOF

BACKGROUND OF THE INVENTION

1. Field of the Invention

This invention relates to switching techniques in the field of wireless communication, and more particularly, to a femtocell base station and a method of switching communication services automatically switch between femtocell base stations when a mobile communication apparatus enters a communication coverage supplied by plural femtocell base stations.

2. Description of Related Art

In the course of development of communication network, network coverage is always an issue of network construction to operators and is also one of the considered elements for customers to choose an operator. Currently, wide area network coverage is quite stable. For example, a macro cell base having large coverage may be applicable to a user flow which has sparse population and fast mobile rate. Even in a remote country, it also achieves wide area network coverage.

However, in terms of a densely populated city, followed by the condition of increased high building density and mobile users in buildings, the indoor area is always a area of weak macro cell system network coverage. Therefor; a micro cellular base station (also referred to femtocell base station) is generated. The described femtocell (Femtocell) base station extends the coverage of mobile communication and solves the problems of weak network coverage of indoor area.

As is well known, switching of a mobile communication terminal (such as a cellular phone) between macro cellular base stations is actually a process of signal comparison, that is, when the mobile communication terminal detects plural surrounding macro cellular base stations simultaneously, it will tend to select a macro cellular base station having larger signal intensity as a connection object. Since the connection of the macro cellular base stations is accomplished by optical fibers, information exchange rate between the macro cell bases is very quick. In other words, signal comparison between macro cellular base stations is synchronous comparison and thus it does not exist a time delay phenomenon. Therefore, there is no comparison distortion between the macro cellular base stations which results in condition of that the mobile communication terminal is switched to a macro cellular base station which does not have the best communication quality.

However, in an architecture of a femtocell base station, the connection between the femtocell base stations is accomplished by network cables. Since transmission rate of a network cable is far less than transmission rate of an optical fiber, it can not perform synchronous comparison of signals between the femtocell base stations as being between the macro cellular base stations. Thus, when the femtocell base station performs comparison of signal intensity, the femtocell base station performing comparison judgment can not immediately capture immediate signal parameters (i.e., signal intensity) of another femtocell base station. Hence, it will generate comparison distortion due to poor reliability of captured signal parameter such that the signal weakens after being switched to another femtocell base station, thereby not accurately and successfully accomplishing system switching.

Therefore, it is imperative for people in related field to how to design a femtocell base station and its switching technique which may improve shortcomings of prior arts.

SUMMARY OF THE INVENTION

In view of the above-mentioned problems of the prior art, it is a primary objective of the present invention to provide a femtocell base station and a method of switching communication services, for solving the problem of comparison distortion in prior art due to that it can not obtain immediate signal intensity for being compared between femtocell base stations when the mobile communication apparatus enters the communication coverage supplied by plural femtocell base stations.

To achieve the above-mentioned and other objectives, the invention provides a femtocell base station applicable to automatically perform a switching process with other femtocell base stations within a communication coverage under a circumstance of a mobile communication apparatus accessing the femtocell base station, comprising: a database for storing an authorization list authorizing the mobile communication apparatus to access the other femtocell base stations within the communication coverage; a setting module for setting up a communication warning value and a signal capturing duration; a detecting module for detecting signal intensity of the femtocell base station and performing a timing process according to a setting range of the signal capturing duration when the signal intensity is less than the communication warning value; a capturing module for continuously capturing the signal intensity of the femtocell base station and the signal intensity of the other femtocell base stations in the authorization list and establishing a priority list according to the signal intensities after the timing process finishes; and a switching module for comparing the signal intensities in the priority list and selecting one from the other femtocell base stations which has the highest priority in the priority list as an object for performing a switching process when the signal intensity of the femtocell base station is less than the signal intensities of the other femtocell base stations in the authorization list.

The invention further provides a method of switching communication services of a femtocell base station applicable to automatically perform a switching process with other femtocell base stations within a communication coverage under a circumstance of a mobile communication apparatus accessing the femtocell base station, comprising steps of establishing an authorization list which authorizes the mobile communication apparatus to access the other femtocell base stations for being stored within the communication coverage and, setting up a communication warning value and a signal capturing duration; detecting signal intensity of the femtocell base station, performing a timing process according to a setting range of the signal capturing duration when the signal intensity is less than the communication warning value, continuously capturing the signal intensities of the femtocell base station and the other femtocell base station in the authorization list until the timing process counts to the signal capturing duration and, establishing a priority list according to the signal intensities of the other femtocell base stations; selecting one from the other femtocell base stations which has the highest priority in the priority list as an object for performing a switching process when the timing process counts to the signal capturing duration and the signal intensity of the femtocell base station is less than the signal intensities of the other femtocell base stations in the priority list so as to interconnect the mobile communication terminal.

In conclusion, the invention selects one from the other femtocell base stations having higher signal intensity as an interconnection object for being interconnected by the mobile communication terminal through setting up the communication warning value and the signal capturing duration and, when the signal intensity of the femtocell base station is less than the communication warning value, comparing the femtocell base station with the signal intensity authorizing the mobile communication apparatus to access the other femtocell base stations. Hence, the invention can effectively solve the problem encountered by prior techniques, that is, the problem of no successful switching due to that when the mobile communication apparatus enters the communication coverage supplied by plural femtocell base stations, the near-end femtocell base station originally supplying communication services cannot immediately obtain signal parameters (i.e., signal intensity) of the other femtocell base station which is going to be switched while in immediately switching.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Furthermore, the drawings of the present invention are all schematically simplified diagrams and only schematically illustrate the basic technique idea of the present invention. Hence, type, amount and proportion of each element in actual implementation may be changed according to implementation requirements.

Figure 1:
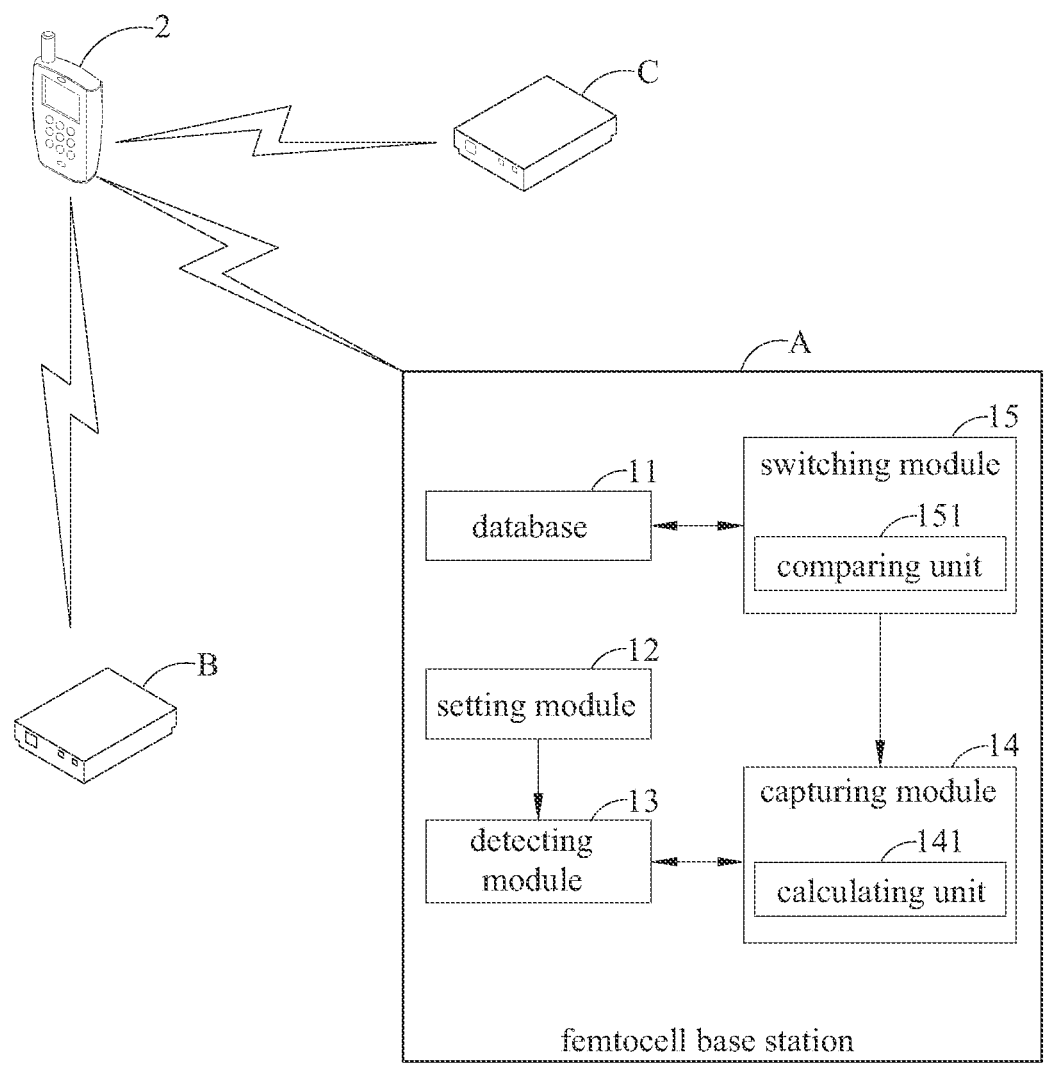
FIG. 1 illustrates a basic architectural system block diagram of a femtocell base station in accordance with the present invention.

Please referring to FIG. 1, which is a basic architectural system block diagram of a femtocell base station in accordance with the present invention. As illustrated, the femtocell base station of the present invention is used to automatically perform a switching process with other femtocell base station B or C within a communication coverage supplied by a femtocell base station A to which a mobile communication apparatus 2 accesses. A switching principle of the present invention is explained herein for clear illustration. In the embodiment, the description is performed by single mobile communication apparatus 2 and three femtocell base stations (A, B and C).

In the embodiment, the previously described femtocell base station is applied in the third generation mobile communication system (3G) and, the femtocell base stations A, B and C all store an authorization list of the near-end femtocell base station authorizing the mobile communication apparatus 2 to access other femtocell base stations. Hence, the mobile communication apparatus 2 in the embodiment has a registered user qualification to the femtocell base stations A, B and C. Furthermore, the mobile communication apparatus 2 is applicable to WCDMA and TD-SCDMA mobile terminals, which comply with 3GPP Release 99, Release 4, Release 5, Release 6, Release 7 and Release 8 and following 3G standard, having position function.

As illustrated in FIG. 1, the femtocell base station A comprises a database 11, a setting module 12, a detecting module 13, a capturing module 14 and a switching module 15.

The database 11 is used to store the authorization list authorizing the mobile communication apparatus 2 to access the other femtocell base stations B and C within the communication coverage supplied by the near-end femtocell base station A. In the embodiment, the database 11 further stores a cell ID and an IP communication address of the femtocell base station A.

The setting module 12 is used to set up a communication warning value and a signal capturing duration. In the embodiment, the communication warning value is based on a communication threshold set provided in a base station communication standard. Specifically, the communication warning value is greater than the communication threshold so as not to interrupt communication while the communication signal intensity of the mobile communication apparatus 2 and the near-end femtocell base station A is less than the communication warning value, wherein the previously described communication warning value and communication threshold both are a default signal intensity parameter. Since the connection between the femtocell base stations is achieved by general network cables, a time delay phenomenon occurs when comparing signals between the femtocell base stations. Therefore, in a specific embodiment, the signal capturing duration is greater than the time delay, while the signal capturing duration is specifically a signal capturing time performing signal intensity capturing.

The detecting module 13 is used to detect signal intensity of itself (the near-end femtocell base station A) and to perform a timing process according to a setting range of the signal capturing duration when the signal intensity is less than the communication warning value. In a specific embodiment, the detecting module 13 detects signal intensity between the near-end femtocell base station A and the mobile communication apparatus 2. When the signal intensity is less than the communication warning value previously predetermined in the setting module 12, the detecting module 13 starts to perform a timing process according to the setting range of the signal capturing duration.

At the time when the detecting module 13 starts to perform the timing process, the capturing module 14 continuously captures signal intensities of femtocell base stations B and C in the authorization list during the signal capturing duration set by the setting module 12 and a built-in calculating unit 141 in the capturing module 14 will calculate the signal intensities of femtocell base stations B and C continuously captured during the signal capturing duration so as to obtain an average signal intensities of femtocell base stations B and C. Then, priority is conformed on the basis of the average signal intensities to establish a priority list. For example, if the average signal intensity of the femtocell base station B is greater than that of the femtocell base station C after being calculated by the calculating unit 141, the femtocell base station B belongs to the highest priority in the established priority list.

Following the previous description, the capturing module 14 further continuously captures signal intensity of the near-end femtocell base station A during the signal capturing duration, and the built-in calculating unit 141 in the capturing module 14 calculates the signal intensity of femtocell base stations A continuously captured during the signal capturing duration so as to obtain an average signal intensity of femtocell base stations A.

When the timing process performed by the detecting module 13 counts to the signal capturing duration set by the setting module 12, the timing process finishes, and the switching module 15 compares signal intensities in the priority list, i.e., comparing signal intensities during the signal capturing duration. In the embodiment, the described comparing process is accomplished by a built-in comparing unit 151 in the switching module 15, i.e., the comparing unit 151 compares average signal intensities calculated by the capturing module 14. When the average signal intensity of the near-end femtocell base station A is less than that of the femtocell base station B or C having highest priority in the priority list, the femtocell base station B or C having highest priority in the priority list is selected to be an object for performing a switching process so as to interconnect the mobile communication apparatus 2. Under another circumstance, when the average signal intensity of the near-end femtocell base station A is not less than (greater than or equal to) that of the femtocell base station B or C having the highest priority in the priority list, the mobile communication apparatus 2 still interconnects and communicates with the near-end femtocell base station A.

Therefore, signal parameter values of other femtocell base stations are obtained in advance during the process of the near-end femtocell base station A performing communication signal intensity comparison. Hence, it may effectively solve the problems of no smooth switching encountered by prior arts due to not obtaining signal parameter values of other femtocell base stations in time while performing switching communication services.

Figure 2:
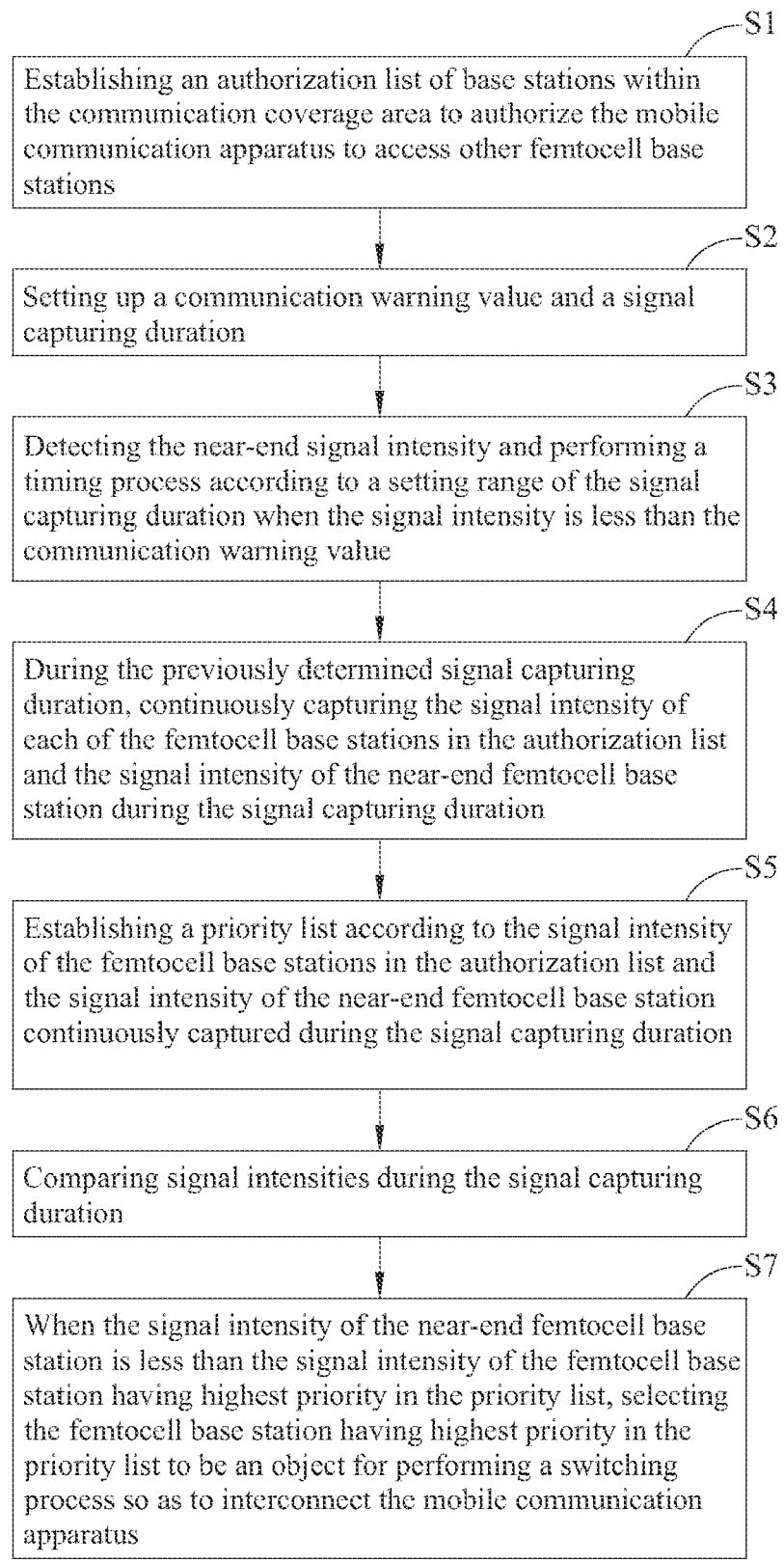
FIG. 2 illustrates a flow chart of a method of switching communication services of the femtocell base station in accordance with the present invention.

Please referring to FIG. 2, which illustrates a flow chart of a method of switching communication services of the femtocell base station in accordance with the present invention. As illustrated, the method of switching communication services of the femtocell base station is used to automatically perform a switching process (handover) with other femtocell base stations (Femtocells) within communication coverage under the circumstances of the mobile communication apparatus accessing the femtocell base station.

The method of switching communication services of the femtocell base station in accordance with the present invention at least comprises the following steps.

First, performing step S1 is establishing an authorization list which is used to authorize the mobile communication apparatus to access other femtocell base stations within the communication coverage. In the embodiment, it further stores a cell ID and an IP communication address of the near-end femtocell base station. Next, step S2 is proceeded.

In step S2, a communication warning value and a signal capturing duration are set up. In the embodiment, the communication warning value is based on a communication threshold set provided in a base station communication standard. Specifically, the communication warning value is greater than the communication threshold so as not to interrupt communication while the communication signal intensity of the mobile communication apparatus and the near-end femtocell base station is less than the communication warning value, wherein the previously described communication warning value and communication threshold both are a default signal intensity. Since the connection between the femtocell base stations is achieved by general network cables, a time delay phenomenon occurs when comparing signals between the femtocell base stations. Therefore, in a specific embodiment, the signal capturing duration is greater than the time delay. Next, step S3 is proceeded.

In step S3, signal intensity of the femtocell base station is detected and, a timing process is performed according to a setting range of the signal capturing duration when the signal intensity is less than the communication warning value. In a specific embodiment, detecting the near-end signal intensity is to detect signal intensity between the near-end femtocell base station and the mobile communication apparatus. When the signal intensity is less than the communication warning value previously predetermined in step S2, it starts to perform a timing process. Next, step S4 is proceeded.

In step S4, when it starts to perform the timing process in step S3, during the signal capturing duration previously set in step S2, it continuously captures signal intensity of femtocell base stations in the authorization list and signal intensity of the near-end femtocell base station during the signal capturing duration. Next, step S5 is proceeded.

In step S5, it establishes a priority list according to signal intensities of femtocell base stations in the authorization list and signal intensity of the near-end femtocell base station continuously captured during the signal capturing duration. Next, step S6 is proceeded.

In step S6, it compares signal intensities during the signal capturing duration. Next, step S7 is proceeded.

In step S7, when signal intensity of the near-end femtocell base station is less than that of the femtocell base station having the highest priority in the priority list, the femtocell base station having the highest priority in the priority list is selected to be an object for performing a switching process so as to interconnect the mobile communication apparatus.

From this, since the communication coverage supplied by the femtocell base station which originally provides communication services and the femtocell base station which is going to be an switching object may provide for the mobile communication apparatus to be interconnected, the femtocell base station which is going to be the switching object may be enable to obtain signal parameters of the femtocell base station which originally provides communication services before performing a switching process. Hence, it may successfully achieve purpose of switching. In another case of step S7, when signal intensity of the near-end femtocell base station is not less than (greater than or equal to) that of the femtocell base station having the highest priority in the priority list, the mobile communication apparatus still interconnects and communicates with the near-end femtocell base station.

Additionally, in terms of signal intensities compared previously and the priority list established according to captured signal intensities, except signal intensities described in previous step, it may be further substituted by average signal intensities. That is, in previous step S5, it may calculate the signal intensity of each femtocell base station continuously captured during the signal capturing duration so as to obtain an average signal intensity of each femtocell base station then, the priority list is established on the basis of the average signal intensities and, in previous step S6, thereby it compares average signal intensities during the signal capturing duration and, in previous step S7, when the average signal intensity of the near-end femtocell base station is less than which of the femtocell base station having the highest priority in the priority list, the femtocell base station having the highest priority in the priority list is selected to be an object for performing a switching process.

In conclusion, the femtocell base station and method of switching communication services in accordance with the present invention selects one from the other femtocell base stations having higher signal intensity as an interconnection object with respect to a mobile communication terminal within the communication coverage supplied by the near-end femtocell base station through setting up a communication warning value and a signal capturing duration and, when the signal intensity is less than the communication warning value, it further compares the near-end femtocell base station which has authorized the mobile communication apparatus 2 to access and provided communication services with signal intensity of another femtocell base station which authorizes the mobile communication apparatus to access. Therefore, in the case of that the near-end femtocell base station cannot obtain immediate signal parameters of the other femtocell base station which are going to be switched, the present invention may effectively obtain immediate signal parameters of other femtocell base stations which is going to be switched and then achieves a well switching performance. Hence, it effectively solves problems encountered by prior art and thus has high industrial utilization value.

The foregoing descriptions of the detailed embodiments are only illustrated to disclose the features and functions of the present invention and not restrictive of the scope of the present invention. One skilled in the art could modify and vary the previous embodiments without violating the spirit and principle of the present invention. Hence, it should be understood to those in the art that all modifications and variations according to the spirit and principle in the disclosure of the present invention should fall within the scope of the appended claims.

What is claimed is:

1. A femtocell base station applicable to automatically perform a switching process with other femtocell base stations within a communication coverage under a circumstance that a mobile communication apparatus accesses the femtocell base station, the femtocell base station comprising:
    a database for storing an authorization list authorizing the mobile communication apparatus to access the other femtocell base stations within the communication coverage;
    a setting module for setting up a communication warning value and a signal capturing duration;
    a detecting module for detecting a signal intensity of the femtocell base station and performing a timing process according to a setting range of the signal capturing duration when the signal intensity is less than the communication warning value;
    a capturing module for continuously capturing the signal intensity of the femtocell base station and the signal intensity of the other femtocell base stations in the authorization list and establishing a priority list according to magnitudes of the signal intensities after the timing process finishes; and
    a switching module for comparing the signal intensities in the priority list and selecting one from the other femtocell base stations which has the highest priority in the priority list as an object for performing a switching process when the signal intensity of the femtocell base station is less than the signal intensities of the other femtocell base stations in the authorization list.

2. The femtocell base station of claim 1, wherein the database is further for storing a cell ID and an IP communication address of the femtocell base station and the other femtocell base stations within the communication coverage.

3. The femtocell base station of claim 1, wherein the capturing module comprises a calculating unit for calculating the signal intensities continuously captured during the signal capturing duration so as to obtain an average signal intensity.

4. The femtocell base station of claim 3, wherein the switching module comprises a comparing unit for comparing the signal intensities during the signal capturing duration.

5. The femtocell base station of claim 1 being applicable to a third generation mobile communication system.

6. A method of switching communication services of femtocell base stations applicable to automatically perform a switching process for a femtocell base station with other femtocell base stations within a communication coverage under a circumstance of a mobile communication apparatus accessing the femtocell base station, the method comprising steps of:
    establishing an authorization list which authorizes the mobile communication apparatus to access the other femtocell base stations within the communication coverage and, setting up a communication warning value and a signal capturing duration;
    detecting a signal intensity of the femtocell base station, performing a timing process according to a setting range of the signal capturing duration when the signal intensity is less than the communication warning value, continuously capturing the signal intensities of the femtocell base station and the other femtocell base stations in the authorization list until the timing process counts to the signal capturing duration and, establishing a priority list according to signal intensities of the other femtocell base stations; and
    selecting one from the other femtocell base stations which has the highest priority in the priority list as an object for performing a switching process when the timing process counts to the signal capturing duration and the signal intensity of the femtocell base station is less than the signal intensities of the other femtocell base stations in the priority list so as to interconnect the mobile communication terminal.

7. The method of claim 6, further comprising storing a cell ID and an IP communication address of the femtocell base station and the other femtocell base stations within the communication coverage.

8. The method of claim 6, further comprising calculating the captured signal intensities until the timing process counts to the signal capturing duration so as to obtain average signal intensities.

9. The method of claim 8, further comprising comparing the signal intensities when the timing process counts to the signal capturing duration, and selecting one from the other femtocell base stations having the highest priority in the priority list as the object for performing the switching process when the average signal intensity of the femtocell base station is less than the average signal intensity of the other femtocell base stations in the authorization list.

10. The method of claim 6 being applicable to a third generation mobile communication system.

* * * * *